United States Patent [19]

Tanaka

[11] Patent Number: 4,943,922
[45] Date of Patent: Jul. 24, 1990

[54] ANTILOCK CONTROL ASSEMBLY

[75] Inventor: Hirohisa Tanaka, Itami, Japan

[73] Assignee: Sumitomo Electric Industries, Ltd., Osaka, Japan

[21] Appl. No.: 277,196

[22] Filed: Nov. 29, 1988

[30] Foreign Application Priority Data

Nov. 30, 1987 [JP] Japan .................. 62-304141

[51] Int. Cl.$^5$ .............................. B60T 8/76
[52] U.S. Cl. .................... 364/426.02; 303/100; 303/102
[58] Field of Search .............. 364/426.02, 426.01, 364/565; 303/95, 100, 102

[56] References Cited

U.S. PATENT DOCUMENTS

| | | | |
|---|---|---|---|
| 4,395,761 | 7/1983 | Sato et al. | 364/426.02 |
| 4,670,852 | 6/1987 | Masaki et al. | 364/565 |
| 4,729,608 | 3/1988 | Fennel et al. | 303/106 |
| 4,759,589 | 7/1988 | Leiber | 303/96 |
| 4,770,266 | 9/1988 | Yamaguchi et al. | 180/197 |
| 4,790,607 | 12/1988 | Atkins | 303/109 |
| 4,802,711 | 2/1989 | Muto et al. | 303/96 |
| 4,805,103 | 2/1989 | Matsuda | 364/426.02 |

Primary Examiner—Thomas G. Black
Attorney, Agent, or Firm—Wenderoth, Lind & Ponack

[57] ABSTRACT

A wheel speed comparator is provided in an antilock brake control assembly for a four-wheel drive automobile. The wheel speed comparator calculates the difference between the average wheel speed of the front wheels and that of the rear wheels. If the difference is larger than a predetermined value, then it is determined which average wheel speed is larger. If that of the front wheels is larger, the comparator provides a pressure reduction command to both rear wheels. If the command persists for over a predetermined period of time, then a pressure reduction command is given to one of the front wheels rotating at a slower speed than the other. If the average wheel speed of the rear wheels is larger, the speeds of the front wheels are compared with each other and a pressure reduction command is given to one of the front wheels having a smaller wheel speed than the other. If the command persists for over a predetermined period of time, then a pressure reduction command is given to both rear wheels.

3 Claims, 3 Drawing Sheets

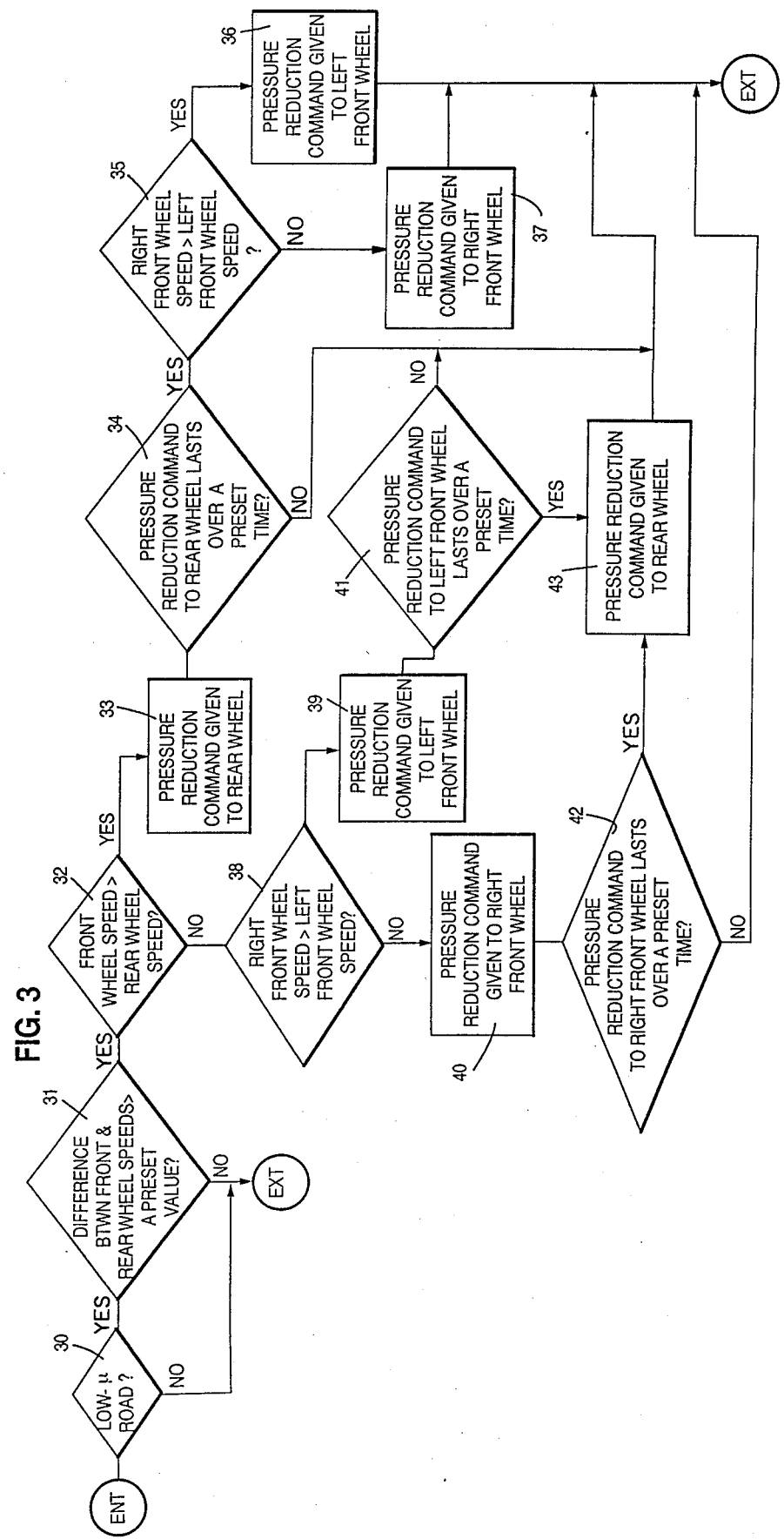

ANTILOCK CONTROL ASSEMBLY

The present invention relates to an antilock control assembly for use in a four-wheel drive vehicle.

A vehicle-mounted antilock control assembly is adapted to adjust the braking force applied to the wheels on the basis of a determination as to whether the wheels are entering a locking state or recovering from a locking state, thereby controlling the slip factor of the wheels.

The locking tendency of the rotating wheels can be detected in various ways. For example, a determination can be made that a wheel is tending to lock when the wheel deceleration has fallen below a predetermined threshold value or when the slip speed (which is the estimated vehicle speed minus the wheel speed) has exceeded a threshold value. In other words, the wheel deceleration and the slip speed are used as control variables for detecting the locking tendency of the wheels.

The wheel deceleration is obtained by differentiating the wheel speed signals from wheel speed sensors provided for the respective wheels and thus it reflects the actual condition of the wheels. On the other hand, the estimated vehicle speed is a value merely estimated from the wheel speed signals and thus does not necessarily represent the actual vehicle speed. If the difference between the estimated vehicle speed and the actual vehicle speed is large, an antilock control system might not operate normally.

In a four-wheel drive vehicle having its center differential provided with a differential limiter mechanism, if one of its wheels or both front wheels or both rear wheels show a tendency to lock while running on a road having a low coefficient of friction (hereinafter represented by $\mu$), the braking torque acting on the locking wheels will be transmitted to the other wheels through the differential limiter mechanism, thus causing the other wheels to approach a locked state. As a result, the wheel speeds of all the wheels will be sharply reduced. This will decrease the estimated vehicle speed to below the actual vehicle speed, so that the antilock control assembly will stop reducing the braking fluid pressure in spite of the fact that the wheels have not fully recovered from the locking tendency. Thus, all the wheels might lock resulting in an insufficient antilock effect.

It is an object of the present invention to provide an antilock control assembly for a four-wheel drive vehicle which obviates the abovesaid shortcomings and which can locate a wheel which is tending to lock by comparing the behavior of the wheels, and which can prevent the braking torque acting on the locking wheel from being transmitted to the other wheels.

The average wheel speed of the front wheels is compared with that of the rear wheels to determine whether or not the difference therebetween is larger than a predetermined value. In other words, a determination is made as to whether or not the difference is so large that the braking torque acting on the locking wheels might be transmitted to the other wheels, thus causing them to lock as well. If it is so determined, a pressure reduction command is given to the front wheels or the rear wheels, of which the average wheel speed is lower than the other, to relieve the wheels from a braking torque.

If the locking wheels fail to return to a normal state, i.e. fail to get out of the influence of the rather strong braking torque, which is known from the fact that the pressure reduction command persists beyond a predetermined period of time, the pressure reduction command is provided to the other wheels to prevent the braking torque on the locking wheels from being transmitted to the other wheels and thus prevent the other wheels from falling into a locking state.

According to the present invention, a wheel which is beginning to lock is found by comparing the rotational speeds of the wheels with one another, and a pressure reduction command is given to the fluid pressure circuit for the locking wheel. If the locking wheel fails to return to a normal state in a given period of time after receiving the pressure reduction command, the command is also given to the other wheels, to prevent the braking torque acting on the locking wheel from being transmitted to the other wheels. If the assembly according to the present invention is applied to a four-wheel drive vehicle equipped with a differential limiter mechanism which serves to transmit the braking torque acting on one wheel to the other wheels, it can pick out a locking wheel more rapidly and more precisely than with any prior art assembly which uses the estimated vehicle speed as a control variable to detect the wheels in the locking state. Thus, it can prevent all the wheels from locking at a same time. Further the locking state of any wheel can be remedied quickly. Thus, the antilock effect will be improved with the assembly according to the present invention. Other objects and features of the present invention will become apparent from the following description taken with reference to the accompanying drawings, in which:

Figure 1:
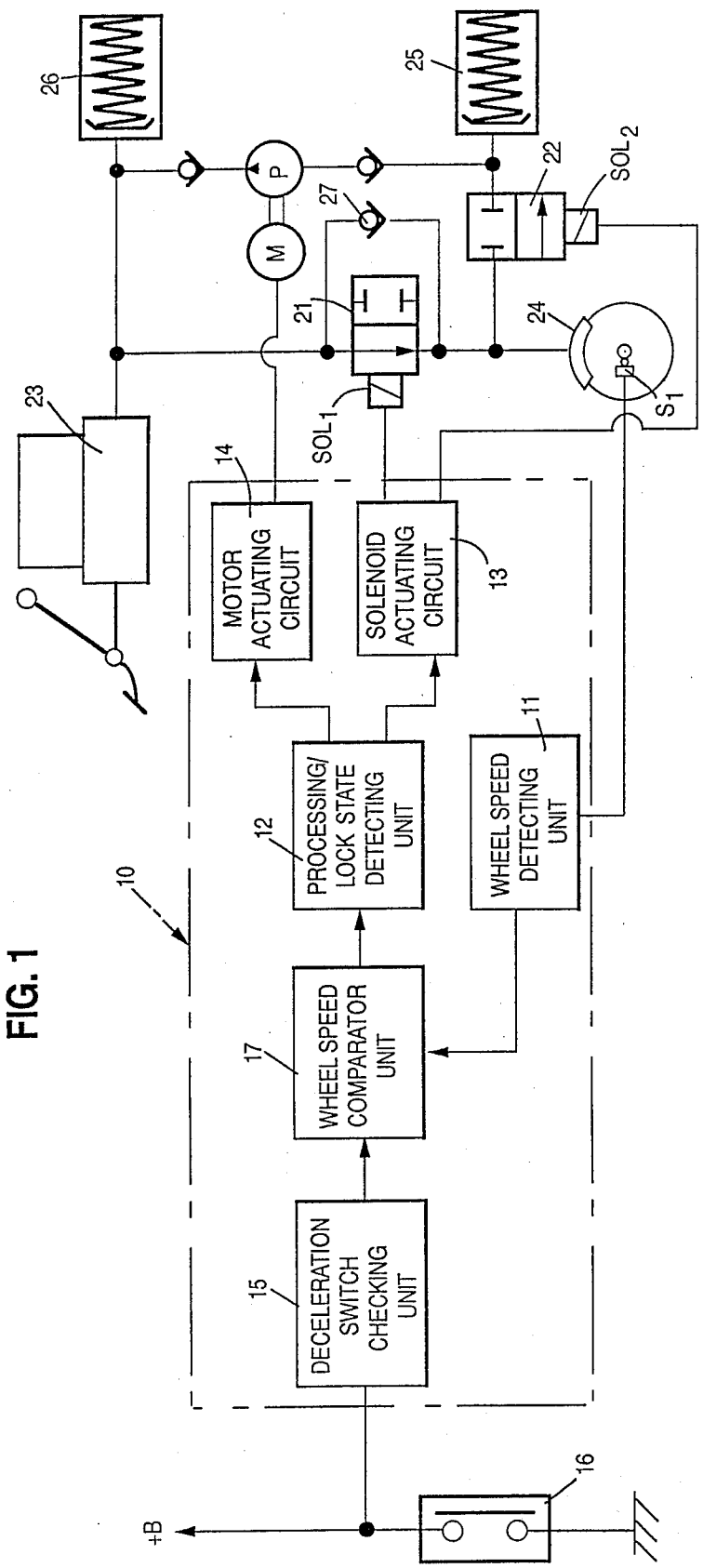
FIG. 1 is a block diagram of an antilock control assembly embodying the present invention.

FIG. 3 is a flow chart showing how the wheel speed comparing/selecting unit functions. FIG. 1 schematically shows the antilock control assembly according to the present invention in which an electronic control unit 10 executes calculations and judgements on the basis of the signals from wheel speed sensors S1 to S4 respectively provided for each wheel (in the drawing only one sensor S1 is shown) to give control signals to a braking fluid pressure circuit.

More specifically, the AC voltage signals from the wheel speed sensor S1 ar converted into pulses and fed through a wheel speed detecting unit 11, which counts the pulses to provide a wheel speed signal, to a processing/lock state detecting unit 12. This unit calculates to determine the wheel deceleration and the estimated vehicle speed. If the wheel deceleration decreases below a predetermined value or if the slip speed increases above a predetermined value, the unit 12 determines that a lock state has occurred and gives a pressure decrease command signal to a solenoid-actuating circuit 13. In response, the circuit 13 energizes solenoids SOL1 and SOL2 to move pressure control valves 21 and 22 to the lefthand side and upwardly of the drawing, respectively. Thus, the valve 21 disconnects a master cylinder 23 from a wheel cylinder 24 and the valve 22 connects the wheel cylinder 24 to a reservoir 25. At the same time, a motor actuating ciruit 14 actuates a motor M and thus a pump P to cause the brake fluid in the reservoir 25 to flow back into an accumulator 26 and the master cylinder 23. This will result in a drop in the brake fluid pressure.

The wheel begins to regain its rotational speed. When the wheel deceleration or the slip speed exceeds a predetermined value, the lock state detecting unit 12 will determine that the wheel has cleared out of the the locking state and issue a pressure increase command to the solenoid actuating circuit 13. In response, the circuit 13 deenergizes the solenoids SOL1 and SOL2 to allow the pressure control valves 21 and 22 to return to their original position shown in FIG. 1. The fluid pressure source is now brought into communication with the fluid pressure circuit for the wheel cylinder 24, thus increasing the braking pressure.

If it is necessary to hold the brake pressure while a pressure increase or pressure reduction command is being given, the solenoid SOL1 is energized while the solenoid SOL2 is deenergized. In this state, the pressure control valve 21 will move to its lefthand position to shut off the fluid pressure circuit, whereas the pressure control valve 22 remains in the position shown in FIG. 1 to seal the brake fluid in the wheel cylinder 24. The brake pressure is thus held constant. Numeral 27 designates a bypass valve.

When interposing a pressure hold command in the pressure reduction process, its timing and conditions may be arranged suitably. For example, the pressure hold command may be issued at a predetermined time after the pressure decrease command has been issued or when the wheel deceleration has exceeded a predetermined threshold value.

Also, the timing and conditions for alternately issuing the pressure increase command and the pressure hold command may be arranged as required. Ordinarilly, a pulse generator or the like is used to issue the pressure hold command at uniform time intervals.

The locking state of the wheels may be determined on the basis of not only the wheel deceleration and the slip speed as described above, but also on the basis of another control variable. Though in FIG. 1 only one fluid pressure channel for one wheel cylinder 24 is shown, the other three channels for the other three wheels are controlled by the respective control unit in the same manner as discussed above.

The electronic control unit 10 also includes a deceleration switch checking unit 15 for detecting the turning-on and off of a deceleration switch 16.

Figure 2:
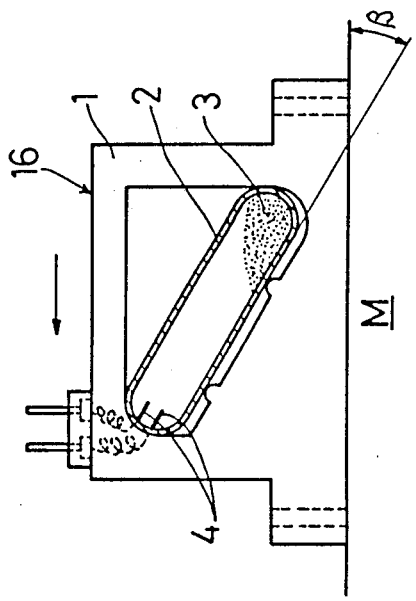
FIG. 2 is a vertical sectional view of an example of a deceleration switch.

Many deceleration switches are known having different structures. FIG. 2 shows one example which has a glass tube 2 mounted in a casing 1 at an angle $\beta$ with respect to a mounting surface M on the vehicle body. Suppose the vehicle is moving in the direction of the arrow, then if the vehicle deceleration exceeds tan $\beta$, mercury 3 in the tube 2 will move toward electrodes 4 by inertia force to electrically connect them together. Thus, it is determined whether or not the vehicle deceleration exceeds a predetermined value according to whether or not the electrodes are electrically connected together.

A deceleration switch of another type has electrodes provided at the lower end of the glass tube 2 so that the electrical connection between the electrodes will be cut off while the deceleration exceeds a predetermined value.

Still another type of deceleration switch is known which includes a rolling element adapted to roll upon the occurrence of a deceleration to activate a limit switch.

The vehicle deceleration value at which the wheels tend to fall into a locking state is considered to be in direct proportion to the coefficient of friction, $\mu$ of the road surface, if the road surface is uniform. Thus, it is possible to distinguish a high-$\mu$ road from a low-$\mu$ road by providing a deceleration switch.

The ON and OFF signals from the deceleration switch checking unit 15 are applied to a wheel speed comparator unit 17. This unit may be incorporated into the electronic control unit 10 (e.g. a microcomputer) as a computer program including such a routine shown in FIG. 3. The routine is for three-channel control (for right and left wheels and both rear wheels). The logic for four-channel control is similar to the one shown in FIG. 3, though it is a little more complex.

In FIG. 3 ENT designates an entrace to the routine and EXT designates an exit to the processing/locking state detecting unit 12.

The routine starts with Step 30 where it is determined whether or not the road surface is a low-$\mu$ surface by checking if the deceleration switch checking unit 15 is providing an ON-signal. If yes, the program leaves the routine from EXT. If not, Step 31 is executed.

In Step 31, the average wheel speed of the front wheels is compared with that of the rear wheels to determine whether or not the difference therebetween is larger than a preset value. If this difference is smaller than the preset value, the steps thereafter will not be executed because in such a case it is not likely that the, braking torque for the front wheels or the rear wheels will be transmitted to the other wheels to cause all the wheels to lock.

If the answer in Step 31 is YES, it is determined in Step 32 which is larger, the average wheel speed of the front wheels or that of the rear wheels. If the former is larger, a pressure reduction command is given to the brake fluid pressure circuit for the rear wheels in Step 33.

It is determined in Step 34 whether or not the pressure reduction command signal has persisted for a longer period of time than a preset value. If yes, it is determined that the rear wheels have failed to fully regain their wheel speed in spite of the the pressure reduction command. In such a case, it is necessary to take some measures to prevent the braking torque from being transmitted to the other wheels.

For this purpose, the wheel speeds of both front wheels are compared with each other in Step 35. If that of the right wheel is larger, a pressure reduction command is given to the fluid pressure circuit for the left wheel in Step 36. If the left wheel is rotating faster, a pressure reduction command is given to the right wheel in Step 37. Such a pressure reduction command may be given to one of the front wheels rotating at a smaller speed if the difference between the wheel speeds of both front wheels is larger than a predetermined value. Further, if both the front wheels are rotating at the same speed, a pressure reduction command may be given to both wheels.

On the other hand, if the result in Step 32 is NO, in other words, if the average wheel speed of the rear wheels is larger than that of the front wheels, the same operations are affected in Steps 38, 39 and, 40 as in Steps 35, 36 and 37, respectively. Then it is determined in Step 41 or 42 whether or not the pressure reduction command has been continuously given for more than a predetermined period of time. If yes, a pressure reduction command is now given to the rear wheels in Step 43.

If the program is for four-channel control, the speeds of both rear wheels may be compared with each other in Steps 33 and 43 so as to give a pressure reduction command only to one rear wheel rotating at a lower speed.

Priority may be given to either of the pressure reduction command issued by the processing/locking state detecting unit 12 and that issued by the wheel speed comparator unit 17.

Any other means than the deceleration switch 16 may be used to measure the value of $\mu$, such as one in which the value obtained by finite-differencing or differentiating the estimated vehicle speed is compared with a predetermined value.

Further, the judgement step of the value of $\mu$ in Step 30 in FIG. 3 may be omitted because even if the road condition is normal, it is still effective to a certain extent to detect a wheel or wheels beginning to lock and prevent the braking force from being transmitted to the other wheels, though this is particularly effective on a low-$\mu$ road.

What is claimed is:

1. An antilock control assembly for use in a four-wheel drive vehicle having two front wheels and two rear wheels, said antilock control assembly comprising: a processing/lock-state detecting means for executing arithmetic operations on the basis of wheel speed signals received from wheel speed sensor means to determine whether each of the two front wheels and two rear wheels are tending to lock or recovering from a locked state and for issuing one of a pressure increase command and a pressure decrease command to increase and decrease a braking fluid pressure on at least one of the two front wheels and two rear wheels; solenoid actuating means for actuating solenoids of pressure control valves in a braking fluid pressure circuit in response to the pressure increase command and the pressure decrease command issued by said processing/lock-state detecting means; and a pressure reduction command means for calculating a difference between an average wheel speed of the two front wheels and an average wheel speed of the two rear wheels, and for comparing said difference with a preset value, and for issuing a pressure reduction command to at least one of the two front wheels or to at least one of the two rear wheels, the average wheel speed of which is smaller than the other, if said difference is larger than said preset value.

2. An antilock control assembly as claimed in claim 1, wherein said at least one of the front wheels or said at least one of the rear wheels upon which the pressure reduction command is issued is a wheel having a speed which is smaller than a speed of the other.

3. An antilock brake control assembly as claimed in claim 1, wherein if said pressure reduction command from said pressure reduction command means persists for more than a predetermined period of time, said pressure reduction command means issues a further pressure reduction command to at least one of the two front wheels if said pressure reduction command is given to the two rear wheels and to at least one of the two rear wheels if said pressure reduction command is given to the two front wheels.

* * * * *